April 17, 1962  J. A. RIDGWAY, JR., ETAL  3,030,191
GAS CHROMATOGRAPHY BY DESTRUCTIVE DEMETHYLATION
Filed Aug. 14, 1958
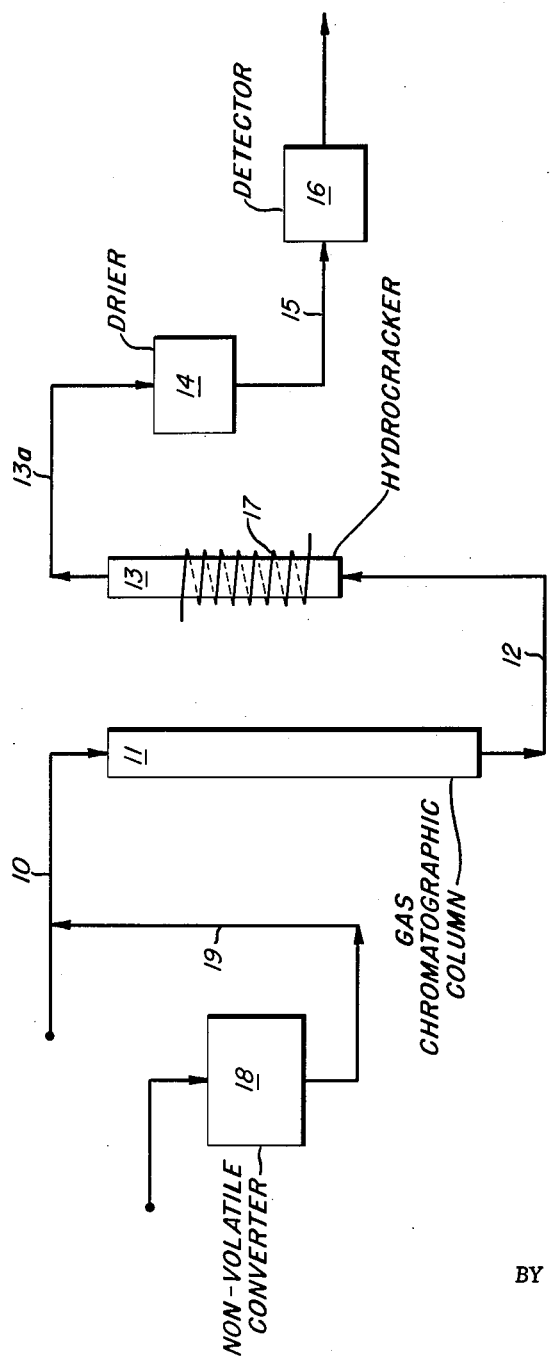
INVENTORS:
John A. Ridgeway, Jr.
Albert Zlatkis
BY
ATTORNEY

United States Patent Office 3,030,191
Patented Apr. 17, 1962

3,030,191
GAS CHROMATOGRAPHY BY DESTRUCTIVE DEMETHYLATION
John A. Ridgway, Jr., Texas City, and Albert Zlatkis, Houston, Tex., assignors, by mesne assignments, to Standard Oil Company, Chicago, Ill., a corporation of Indiana
Filed Aug. 14, 1958, Ser. No. 754,995
4 Claims. (Cl. 23—232)

This invention relates to method and means for analyzing fluids by gas chromatography and is concerned with a method and means for detecting and analyzing quantitatively the components of a mixture separated by chromatography.

Gas chromatography, a relatively new and useful technique for the separation and analysis of complex mixtures of volatile materials, is a system wherein components of such mixtures are separated in simple and relatively inexpensive equipment. Analysis can be made on micro samples and the system may also be used for monitoring process streams. Such analysis can be made in a relatively short time, and the technique is applicable to samples ranging from those that boil below room temperature to those that can be distilled at low pressure.

The separations may take place in small columns packed with various types of solids which support a liquid stationary phase. For example, with a liquid stationary phase amounting to about 5–40 weight percent of a solid packing, the liquid is distributed as a thin film but provides a large surface for the gas to contact. Components of a sample are separated as they are carried through the column by a moving gas phase, called the carrier or eluting gas, and the components of the sample are detected as they pass from the column.

Variables that affect separation include column length and diameter, flow rate, composition and pressure of the eluting gas, the chemical and physical properties of the stationary phase, and the column temperature. Nitrogen, helium, hydrogen and carbon dioxide are common eluting gases.

A flow rate of eluting gas is selected to give an adequate separation in a reasonable length of time, the usual range being 5 to 75 ml. per minute and about 20 ml. per minute or more being preferred. The lower rates are useful where higher pressure drop is to be avoided.

Typically in a binary mixture, one of the components may have its vapor pressure altered to a different degree than the other component by the degree and/or kind of physical-chemical forces that operate on it in its relation to the liquid or solid stationary phase. Because of differences in effective vapor pressure, the first and second components emerge from the column in the eluting gas at different times and thus are separated and identified by means of a suitable detector. Such detectors may comprise thermal conductivity cells, gas density balances and other devices sensitive to micro quantities of sample components.

It will be apparent that for a detector to be useful in this type of system the response of the detector must be rapid to change in composition in the eluting gas stream. Equipment for the analysis of hydrocarbon mixtures by gas chromatography is commonly designed around a sensing element or detector which measures gas thermal conductivity. However, thermal conductivity of gas mixtures of different hydrocarbon components varies in a manner not easily predictable. Under these conditions it is necessary to use experimentally determined calibration factors in the quantitative interpretation of a chromatogram. The use of such calibration factors is costly in terms of time required for analysis and considerable experimental effort is required for their evaluation. Accordingly, it would be desirable to provide a system which avoids the necessity for using individual component calibration factors.

Many types of detectors have been proposed and tried for sensing the presence of a given component in the eluting gas, but these have not been satisfactory in all types of separations. It is with respect to modifications in the gas chromatography system which facilitates the detection of components that this invention is directed.

The difficulty with detectors in general is that the diluted nature of the components to be detected makes a high degree of sensitivity necessary, and this is difficult to obtain for wide ranges of rates of flow through the separation column. Furthermore, certain detectors are, to some extent, dependent upon the nature of the components to which they have already been subjected.

Detectors most commonly found in gas chromatographic analyzers are of the thermal conductivity cell type. Such detectors, particularly those employing a thermistor as the sensitive element, decrease in sensitivity with increasing temperature. Since it is necessary sometimes to heat the cell to prevent condensation effects of high boiling materials leaving a chromatographic column, new approaches to this problem have been considered.

It is therefore an object of our invention to provide method and means for obtaining increased sensitivity of a thermal conductivity cell at ambient temperatures. A further object of the invention is to provide a system wherein calibration due to differences in thermal conductivities of the separated components are unnecessary. Another object of the invention is to provide a system which is adapted to the analysis of aqueous solutions of aldehydes, alcohols and ketones. It is also an object of the invention to provide a versatile yet simple system for separating and detecting a wide variety of components which heretofore have resisted analysis by gas chromatography. A further object of the invention is to provide an apparatus wherein the deficiencies of systems heretofore proposed are voided. An additional object of the invention is to provide a gas chromatography analyzer apparatus and technique wherein the detector can be uniquely sensitive to a particular component. These and other objects of the invention will become apparent as the description thereof proceeds.

Briefly, according to our invention we provide means for making the chromatographic separation, means for hydrocracking eluted components from such separation, and means for detecting the presence of the hydrocracking product. If desired, the feed to the chromatographic separation may be subjected to a preliminary conversion, e.g., alkali metal mercaptides to mercaptans. Likewise, the hydrocracked product may be subjected to a drying step prior to flow through the detector.

In a preferred arrangement, a demethylation reactor is placed between the outlet of the chromatographic column and the inlet of a thermal conductivity cell. Hydrogen is used as the carrier or eluting gas and all hydrocarbons are converted to methane. The thermal conductivity cell then measures only the concentration of methane in hydrogen thereby eliminating the necessity of calibration for various hydrocarbon types. Further details and advantages of our invention will be described by reference to embodiments thereof illustrated in the drawing, comprising a schematic flow sheet embodying our invention.

The eluting gas is introduced by line 10 into the chromatographic analyzer column 11 and emerges therefrom by line 12. A small converter tube 13 containing a hydrocracking catalyst receives the flow from line 12 from the exit end of the chromatographic column 11. As each compound emerges from the column 11 it is converted in tube 13 to methane (and water in the case of oxygenated compounds). The water which may be present is removed in a drying column 14 containing, for example, calcium sulfate, and the dry methane is carried by the eluting gas through a line 15 into the thermal conductivity cell 16.

The methane converter 13 comprises a 24 cm. length of Pyrex glass tube 5 mm. in diameter and filled with a nickel catalyst of 30–60 mesh. Seventy percent nickel on kieselguhr operated from about 450° to 800° F., for example, 600° F., and at about 600 $V_o$/hr./$V_c$ is satisfactory for hydrocracking conditions wherein demethylation is obtained. Suitable catalyst is Harshaw Nickel Catalyst N1–0104. The tube converter 13 is maintained at demethylation temperature by means of a nicrome heater coil 17.

Compounds susceptible to complete hydrocracking to methane have been analyzed using hydrogen as the carrier gas. For example, the methane conversion procedure described herein has been used for mixtures containing (a) $C_1$–$C_{12}$ paraffins and olefins, (b) $C_5$–$C_8$ naphthenes, and (c) $C_2$–$C_5$ aldehydes, alcohols and ketones.

In making these analyses increased sensitivity and hence reproducibility and repeatability is obtained by being able to operate the detector at ambient temperatures to detect only methane. However, the method is applicable to detectors other than thermal conductivity cells where hydrogen is used as a carrier gas, one such being the hydrogen flame detector.

The use of demethylation in gas chromatography results in an increase in sensitivity and this increased sensitivity allows the charging of smaller samples to the chromatographic analyzer and this, in turn, allows better resolution. Comparative data showing the effect of demethylation on peak heights are set forth in the following table:

TABLE

*Effect of Demethylation on Peak Heights*

| Component | Peak Height | |
|---|---|---|
| | Without Demethylation | With Demethylation |
| neohexane | 11 | 20 |
| diisopropyl | 6.5 | 12 |
| 2-methyl pentane | 29 | 57 |
| 3-methyl pentane | 15.5 | 32 |
| n-hexane | 32.5 | 65 |

In some cases the materials to be analyzed are nonvolatile and hence cannot be analyzed directly by gas chromatography. In our system, such materials are first converted to a volatile derivative by some reaction convenient to the particular materials. As an example, an aqueous solution of the alkali metal salts of carboxylic acids or of mercaptans can be analyzed if they are first converted to the volatile free acid or free mercaptan. This is conveniently done within a reactor 18 which contains a bed of firebrick previously impregnated with about 40 weight percent sulfuric acid. The volatile free acids or mercaptans may thereby be introduced by line 19 with a hydrogen carrier gas from line 10 into the chromatographic analyzer column 11 and processed as described above.

When a solution of the alkali metal salts of mercaptans is injected over the acid containing firebrick, reaction occurs instantly to produce an alkali sulfate and the free mercaptans. These latter flow to the chromatographic column 11 containing a suitable solid support and a stationary liquid phase adapted to effect a mercaptan separation. As each mercaptan emerges from the column 11 it is transferred by line 12 to the microreactor 13 containing a nickel catalyst and maintained between 500° and 750° F., preferably about 600° F. Here the mercaptans are converted to methane and a nickel-sulfur compound that remains in the catalyst bed.

The methane produced along with water from the original solution then pass by line 14a into the drying column 14 thereby allowing only methane to enter the thermal conductivity cell 16 where analysis takes place.

We have found that hydrocracking is incomplete and slow at temperatures below 450° F. on the hydrocarbons tested. Hydrogen flow rates of 40–60 ml. per minute were used. The Harshaw Nickel Catalyst was packed in a 10″ x ¼″ reactor converter tube 13 about 10″ long with the catalyst occupying about 4 inches.

The compounds tested included: propane, propylene, 2-methylpentane, 3-methylpentane, 2,3-dimethylbutane, 2,2-dimethylbutane, 2,4-dimethylpentane, n-hexane, methylcyclohexane, 4-methylpentene-2, cyclopentane, methylcyclopentane, dimethylcyclohexane, dodecane, acetaldehyde, valeraldehyde, 1-pentanol, 3-pentanone and acetone.

In each test only one peak (methane) appeared on the chromatogram after hydrocracking, indicating that the determination was complete.

Although the invention has been described with reference to embodiments thereof, it should be understood that these are by way of illustration only and that the invention is not necessarily limited thereto. Alternative modifications and operating techniques will become apparent to those skilled in the art in view of our foregoing disclosure, and, accordingly, modifications are contemplated without departing from the spirit of our invention.

What we claim is:

1. A method for detecting and analyzing quantitatively the components of a hydrocarbon gas mixture which may be hydrocracked to methane and which have been separated from one another by the process of gas chromatography, which comprises the improvement of passing the separated components directly to a hydrocracking zone, hydrocracking the separated component in the presence of hydrogen to form methane, said hydrocracking being conducted over a nickel catalyst at a temperature of between about 450 and 800° F. and at a space velocity sufficient to effect substantially complete demethylation of the hydrocarbon gas, and analyzing the hydrocracking product stream for methane as a quantitative measure of the component.

2. In a gas chromatographic analyzing process, the improvement which comprises conducting the chromatographic separation of a stream containing hydrocarbons with a hydrogen eluting gas, passing the total eluted gas stream directly to a hydrocracking zone to convert hydrocarbons in said stream to methane, and analyzing the hydrocracked stream in the presence of such hydrogen for the quanitative determination of methane therein.

3. In a process for analyzing a fluid stream containing an admixture of volatilizable hydrocarbon materials convertible by hydrocracking to methane, separating said materials from one another by the process of gas chromatography with hydrogen as the eluting gas, successively subjecting the separated components of said materials to hydrocracking, whereby the component is converted to methane and water, removing water from the hydrocracked product stream, and analyzing the hydrocracked product stream for methane as a measure of the component.

4. The process of claim 2 wherein the hydrocracked stream contains water vapor in addition to hydrogen and methane and includes the process step of removing water from the said stream before analyzing it for methane.

References Cited in the file of this patent

UNITED STATES PATENTS 2,813,010   Hutchins _____ Nov. 12, 1957

OTHER REFERENCES

Green: "Nature" 180, 295, 296 (1957).
Martin et al.: "Nature" 175, 422, 423 (1955).
Zlatkis et al.: "Anal. Chem." 30, 1156 (June 1958).